United States Patent
Wang et al.

(10) Patent No.: US 11,978,447 B2
(45) Date of Patent: May 7, 2024

(54) SPEECH INTERACTION METHOD, APPARATUS, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Haifeng Wang, Beijing (CN); Jizhou Huang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 570 days.

(21) Appl. No.: 17/279,540

(22) PCT Filed: Sep. 17, 2020

(86) PCT No.: PCT/CN2020/116018
§ 371 (c)(1),
(2) Date: Mar. 24, 2021

(87) PCT Pub. No.: WO2021/164244
PCT Pub. Date: Aug. 26, 2021

(65) Prior Publication Data
US 2022/0351721 A1    Nov. 3, 2022

(30) Foreign Application Priority Data
Feb. 18, 2020   (CN) .......................... 202010099574.4

(51) Int. Cl.
*G10L 15/22*    (2006.01)
*G06F 16/33*    (2019.01)
(Continued)

(52) U.S. Cl.
CPC .......... *G10L 15/22* (2013.01); *G06F 16/3344* (2019.01); *G10L 15/063* (2013.01);
(Continued)

(58) Field of Classification Search
CPC . G06F 16/33; G06F 3/167; G06F 3/16; G10L 15/063; G10L 15/197;
(Continued)

(56) References Cited

U.S. PATENT DOCUMENTS 11,694,682 B1 *  7/2023  Reinspach .......... G10L 15/1815
704/251
2006/0018440 A1     1/2006  Watkins et al.
(Continued)

FOREIGN PATENT DOCUMENTS

CN    105206266 A    12/2015
CN    105869631 A     8/2016
(Continued)

OTHER PUBLICATIONS

Supplemental European Search Report, Application No. EP20864285, PCT/CN2020116018, dated Oct. 22, 2021, 11 pages.
(Continued)

*Primary Examiner* — Huyen X Vo
(74) *Attorney, Agent, or Firm* — Kwan & Olynick LLP (57) ABSTRACT

The present disclosure provides a speech interaction method, apparatus, device and computer storage medium and relates to the field of artificial intelligence. A specific implementation solution is as follows: performing speech recognition and demand analysis for a first speech instruction input by a user; performing demand prediction for the first speech instruction if the demand analysis fails, to obtain at least one demand expression; returning at least one of the demand expression to the user in a form of a question; performing a service response with a demand analysis result corresponding to the demand expression confirmed by the user, if a second speech instruction confirming at least one of the demand expression is received from the user. The (Continued)

present disclosure can efficiently improve the user's interaction efficiency and enhance the user's experience.

14 Claims, 6 Drawing Sheets

(51) Int. Cl.
*G10L 15/06* (2013.01)
*G10L 15/197* (2013.01)

(52) U.S. Cl.
CPC ...... *G10L 15/197* (2013.01); *G10L 2015/221* (2013.01); *G10L 2015/223* (2013.01)

(58) Field of Classification Search
CPC ......... G10L 2015/221; G10L 2015/223; G10L 15/08; G10L 15/26; G10L 2015/0631; G10L 15/14; G10L 15/06; G10L 2015/225; G10L 15/22
See application file for complete search history.

(56) References Cited

U.S. PATENT DOCUMENTS

| | | | |
|---|---|---|---|
| 2006/0167696 A1* | 7/2006 | Chaar | G10L 15/22 704/E15.04 |
| 2014/0278413 A1* | 9/2014 | Pitschel | G10L 15/22 704/243 |
| 2016/0357818 A1* | 12/2016 | Hornkvist | G06F 16/3331 |
| 2017/0140754 A1 | 5/2017 | Ichimura et al. | |
| 2021/0034705 A1* | 2/2021 | Chhaya | G06F 40/205 |

FOREIGN PATENT DOCUMENTS

| | | |
|---|---|---|
| CN | 107077843 A | 8/2017 |
| CN | 107463311 A | 12/2017 |
| CN | 107516516 A | 12/2017 |
| CN | 108182229 A | 6/2018 |
| CN | 105206266 B | 9/2018 |
| CN | 108920497 A | 11/2018 |
| CN | 108920622 A | 11/2018 |
| CN | 110019662 A | 7/2019 |
| CN | 110046221 A | 7/2019 |
| CN | 110111788 A | 8/2019 |
| CN | 110138982 A | 8/2019 |
| CN | 110196894 A | 9/2019 |
| CN | 110288985 A | 9/2019 |
| CN | 110459208 A | 11/2019 |
| CN | 110704703 A | 1/2020 |
| CN | 111341309 A | 6/2020 |
| JP | 2006227954 A | 8/2006 |
| JP | 2009025538 A | 2/2009 |
| JP | 2018528458 A | 9/2018 |
| JP | 2020016784 A | 1/2020 |
| WO | 2014144949 A2 | 9/2014 |
| WO | 2016151698 A1 | 9/2016 |

OTHER PUBLICATIONS

Office Action, Chinese Application No. 202010099574.4, China Patent Office, dated Nov. 26, 2020, 9 pages.
Search Report, Chinese Application No. 202010099574.4, China Patent Office, dated Nov. 11, 2020, 3 pages.
Office Action, Chinese Application No. 202010099574.4, China Patent Office, dated Mar. 2, 2021, 9 pages.
Search Report, Chinese Application No. 202010099574.4, China Patent Office, dated Feb. 19, 2021, 2 pages.
PCT International Search Report, PCT Application No. PCT/CN2020/116018, dated Dec. 8, 2020, 12 pages.
Communication under Rule 71(3) EPC for EP20864285.0, dated Nov. 22, 2022, 45 pgs.
First Japanese Office Action for JP2021-571465, dated Jan. 10, 2023, 3 pgs.

\* cited by examiner

SPEECH INTERACTION METHOD, APPARATUS, DEVICE AND COMPUTER STORAGE MEDIUM

This application is a national application and, pursuant to 35 U.S.C. § 371, is entitled to and claims the right of priority based on PCT Application No. PCT/CN2020/116018, filed Sep. 17, 2020, which claims priority to Chinese Patent Application No. 2020100995744, entitled "Speech Interaction Method, Apparatus, Device and Computer Storage Medium", filed on Feb. 18, 2020, all of which are incorporated by reference in their entirety.

FIELD OF THE DISCLOSURE

The present disclosure relates to the technical field of computer application, and particularly to a speech interaction method, apparatus, device and computer storage medium in the field of artificial intelligence.

BACKGROUND OF THE DISCLOSURE

This portion is intended to provide background or context for embodiments of the present disclosure stated in the claim set. The depictions here will not be considered as prior art as being included in this portion.

As the speech interaction technology develops constantly, the user can perform speech interaction with a smart sound box, a smart phone etc. Besides an operating system of the terminal device carries a speech assistant with it, more and more applications carry the speech interaction technology. The user can acquire a corresponding service by inputting a speech instruction, thereby freeing the user's hands to a great degree.

In a conventional speech interaction scenario, if the user's demand cannot be understood very well after performing speech recognition for the user-input speech instruction and understanding the user's demand, the following two types of speech responses will be returned to the user:

1) returning a result to the effect that the user's demand is not understood, for example, "sorry, cannot understand you temporarily".

2) returning the user a result of prompting the user to change a speech instruction, for example, "sorry, please turn to a simpler speech for a try".

However, either of the above speech responses brings about a poor experience to the user, and the user will feel a poor intelligence degree of the speech assistant. In addition, the input speech instruction needs to be changed repeatedly, which causes very low interaction efficiency to the user.

SUMMARY OF THE DISCLOSURE

To address the above technical problems, the present disclosure provides a speech interaction method, apparatus, device and computer storage medium to facilitate improving the user's interaction efficiency and enhancing the user's experience.

In a first aspect, the present disclosure provides a speech interaction method, including:

performing speech recognition and demand analysis for a first speech instruction input by a user;

performing demand prediction for the first speech instruction if the demand analysis fails, to obtain at least one demand expression;

returning at least one of the demand expression to the user in a form of a question;

performing a service response with a demand analysis result corresponding to the demand expression confirmed by the user, if a second speech instruction confirming at least one of the demand expression is received from the user.

According to a preferred embodiment of the present disclosure, the method further includes:

if the demand analysis succeeds, performing a service response with a demand analysis result corresponding to the first speech interaction.

According to a preferred embodiment of the present disclosure, the performing demand prediction for the first speech instruction to obtain at least one demand expression includes:

inputting the first speech instruction into a pre-trained demand prediction model, the demand prediction model mapping the first speech instruction to at least one demand expression.

According to a preferred embodiment of the present disclosure, the demand prediction model is obtained by pre-training in the following manner:

obtaining training data which include a plurality of sentence pairs, each sentence pair including a first sentence and a second sentence, wherein the second sentence can be successfully analyzed in respect of the demand;

using the training data to train a Sequence to Sequence Seq2Seq model to obtain the demand prediction model, wherein the first sentence in the sentence pair serves as an input of the Seq2Seq model, and the second sentence servers as a target output of the Seq2Seq model.

According to a preferred embodiment of the present disclosure, the training data obtained from a text search log;

wherein a text search query is taken as the first sentence, the second sentence is obtained using a clicked search result corresponding to the query, the first sentence and second sentence form the sentence pair, and a confidence of the second sentence is determined by times of click of the second sentence when the first sentence is taken as the query.

According to a preferred embodiment of the present disclosure, the returning at least one of the demand expression to the user in a form of a question includes:

regarding a demand expression with the highest confidence in the at least one demand expression obtained by the demand prediction model by mapping as the first demand expression;

returning the first demand expression to the user in a form of a question.

According to a preferred embodiment of the present disclosure, the returning at least one of the demand expression to the user in a form of a question includes:

if a third speech instruction denying the first demand expression is received from the user, taking a demand expression with the second highest confidence in the at least one demand expression obtained by the demand prediction model by mapping as a second demand expression;

returning the second demand expression to the user in a form of a question.

According to a preferred embodiment of the present disclosure, the returning at least one of the demand expression to the user in a form of a question includes:

returning demand expressions with top N confidences in the at least one demand expression obtained by the demand prediction model by mapping to the user in a form of a question, N being a preset positive integer.

According to a preferred embodiment of the present disclosure, the method further includes:

analyzing a reason for failure of the demand analysis, the question further carrying the reason for failure of the demand analysis.

According to a preferred embodiment of the present disclosure, the reason for the failure of demand analysis includes:

noisy environment, a length of the first speech instruction beyond a limit, inaccurate pronunciation of the first speech instruction, or too colloquial expression of the first speech instruction.

In a second aspect, the present disclosure provides a speech interaction apparatus, including:

a speech interaction unit configured to receive a first speech instruction input by the user;

a speech processing unit configured to perform speech recognition and demand analysis for the first speech instruction;

a demand prediction unit configured to perform demand prediction for the first speech instruction if the demand analysis fails, to obtain at least one demand expression;

the speech interaction unit further configured to return at least one of the demand expression to the user in a form of a question;

a service response unit configured to perform a service response with a demand analysis result corresponding to the demand expression confirmed by the user, if the speech interaction unit receives a second speech instruction confirming at least one of the demand expression from the user.

According to a preferred embodiment of the present disclosure, the service response unit is further configured to, if the demand analysis succeeds, perform a service response with a demand analysis result corresponding to the first speech interaction.

According to a preferred embodiment of the present disclosure, the demand prediction unit is specifically configured to input the first speech instruction into a pre-trained demand prediction model, the demand prediction model mapping the first speech instruction to at least one demand expression.

According to a preferred embodiment of the present disclosure, the apparatus further includes:

a model training unit configured to obtain training data which include a plurality of sentence pairs, each sentence pair including a first sentence and a second sentence, wherein the second sentence can be successfully analyzed in respect of the demand; use the training data to train a Seq2Seq model to obtain the demand prediction model, wherein the first sentence in the sentence pair serves as an input of the Seq2Seq model, and the second sentence servers as a target output of the Seq2Seq model.

According to a preferred embodiment of the present disclosure, upon returning at least one of the demand expression to the user in a form of a question, the speech interaction unit specifically performs:

regarding a demand expression with the highest confidence in the at least one demand expression obtained by the demand prediction model by mapping as the first demand expression;

returning the first demand expression to the user in a form of a question.

According to a preferred embodiment of the present disclosure, upon returning at least one of the demand expression to the user in a form of a question, the speech interaction unit is further used to:

if a third speech instruction denying the first demand expression is received from the user, take a demand expression with the second highest confidence in the at least one demand expression obtained by the demand prediction model by mapping as a second demand expression;

return the second demand expression to the user in a form of a question.

According to a preferred embodiment of the present disclosure, upon returning at least one of the demand expression to the user in a form of a question, the speech interaction unit specifically performs:

returning demand expressions with top N confidences in the at least one demand expression obtained by the demand prediction model by mapping to the user in a form of a question, N being a preset positive integer.

According to a preferred embodiment of the present disclosure, the apparatus further includes:

a reason analysis unit configured to analyze a reason for failure of the demand analysis, the question further carrying the reason for failure of the demand analysis.

In a third aspect, the present disclosure further provides an electronic device, including:

at least one processor; and a memory communicatively connected with the at least one processor; wherein, the memory stores instructions executable by the at least one processor, and the instructions are executed by the at least one processor to enable the at least one processor to execute the method according to the above first aspect.

In a further aspect, the present disclosure further provides a non-transitory computer-readable storage medium storing computer instructions therein, wherein the computer instructions are used to cause the computer to execute the method according to the above first aspect.

As can be seen from the above technical solutions, after the demand analysis for the speech instruction input by the user fails, the demand will be predicted for the speech instruction to "guess" the user's possible expression of the demand and return it to the user for confirmation, instead of simply and bluntly advising the user that his speech cannot be understood, thereby improving the user's interaction efficiency and enhancing the user's experience.

Other effects of the above optional modes will be described below in conjunction with specific embodiments.

BRIEF DESCRIPTION OF DRAWINGS

The figures are intended to facilitate understanding the solutions, not to limit the present disclosure. In the figures.

DETAILED DESCRIPTION OF PREFERRED EMBODIMENTS

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Figure 1:
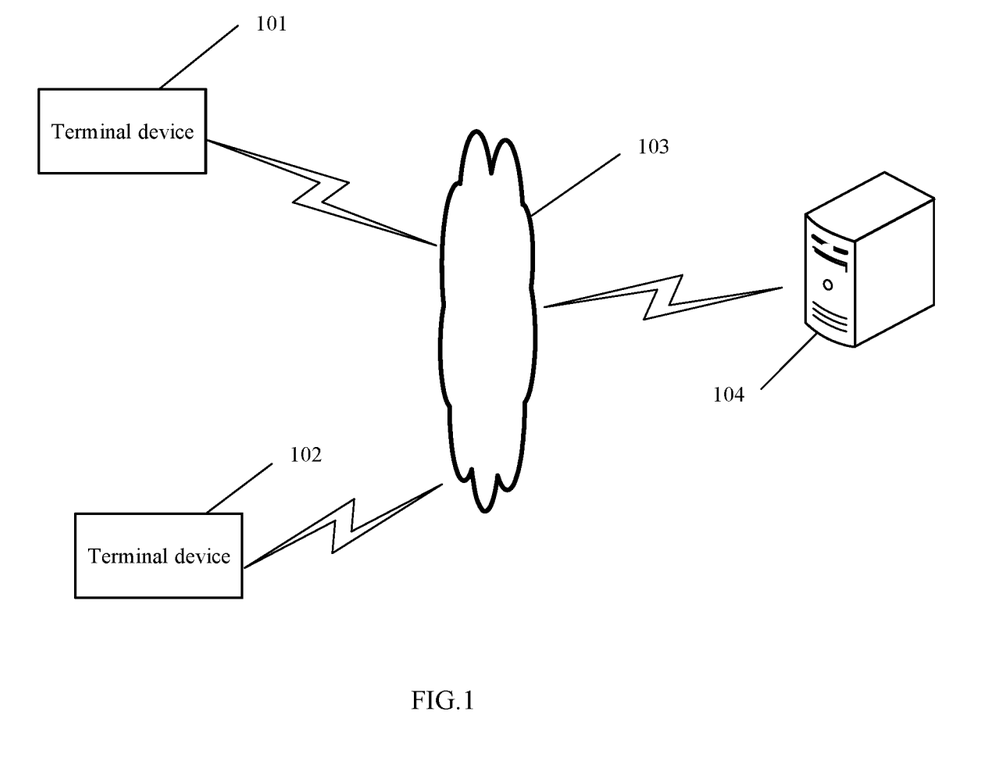
FIG. 1 illustrates an exemplary system architecture in which a speech interaction method or speech interaction apparatus according to embodiments of the present disclosure may be applied.

FIG. 1 illustrates an exemplary system architecture in which a speech interaction method or speech interaction apparatus according to embodiments of the present disclosure may be applied.

As shown in FIG. 1, the system architecture may comprise terminal devices 101 and 102, a network 103 and a server 104. The network 103 is used to provide a medium for a communication link between the terminal devices 101, 102 and the server 104. The network 103 may comprise various connection types such as wired link, a wireless communication link or an optical fiber cable.

The user may use the terminal devices 101 and 102 to interact with the server 104 via the network 103. The terminal devices 101 and 102 may have various applications installed thereon, such as voice interaction applications, webpage browser applications, communication-type applications, etc.

The terminal devices 101 and 102 may be various electronic devices supporting speech interaction, or may be devices with a screen or devices without a screen. The terminal devices 101 and 102 include but not limited to smart phones, tablet computers, smart sound boxes, smart TV sets etc. The speech interaction device according to the present disclosure may be disposed or run in the server 104, or may be disposed and run in the terminal devices 101 and 102 with a strong processing function. The speech interaction device may be implemented as a plurality of software or software modules (e.g., for providing distributed service) or as a single software or software module, which will not be limited in detail herein.

For example, the speech interaction device is disposed and runs in the server 104, and the terminal device 101 sends the user-input speech instruction to the server 104 through the network 103. After processing by the method according to the present embodiment of the present invention, the server 104 returns a processing result to the terminal device 101, and then the result is provided to the user via the terminal device 101, thereby achieving the speech interaction with the user.

The server 104 may be a single server or a server group consisting of a plurality of servers. It should be appreciated that the number of the terminal devices, network and server in FIG. 1 is only for illustration purpose. Any number of terminal devices, networks and servers are feasible according to the needs in implementations.

In a traditional speech interaction scenario, if the user's demand is not analyzed successfully after performing speech recognition for the user-input speech instruction and analyzing the demand, a result to the effect that the user's demand is not understood is returned to the user, or a result of prompting the user to change a speech instruction is returned to the user. For example, there are the following speech interaction scenarios:

Scenario 1

User: Can you help me to find a nursing place nearest to me? The baby is hungry. Thanks.

Speech assistant: sorry, XX (indicating the name of the speech assistant, e.g., Xiaodu of Baidu, Xiao'ai of Xiaomi, TmallGenie of Alibaba etc.) cannot understand you temporarily.

In this scenario, the user will think that this speech assistant is really stupid and not smart at all.

Scenario 2

The user: Can you help me to find a nursing place nearest to me? The baby is hungry. Thanks.

Speech assistant: sorry, XX cannot understand you temporarily. Please change a simpler speech for a try.

The user: I need to find a nursing place nearest to me

Speech assistant: sorry, XX cannot understand you temporarily. Please change a simpler speech for a try.

In this scenario, if the speech assistant still cannot understand the user's demand after the user has made many attempts and changes speeches many times, the user is prone to lose patience. Such an interaction manner is obviously very inefficient for the user, and the user's experience is very bad.

In view of the above, the core idea of the present disclosure is that if the user's demand is not analyzed successfully after performing speech recognition for the user-input speech instruction and analyzing the demand, the demand will be predicted according to the speech instruction to "guess" the user's possible expression of the demand and return it to the user for confirmation, instead of simply and bluntly advising the user that his speech cannot be understood. The method according to the present disclosure will be described in detail in conjunction with embodiments.

Embodiment 1

Figure 2:
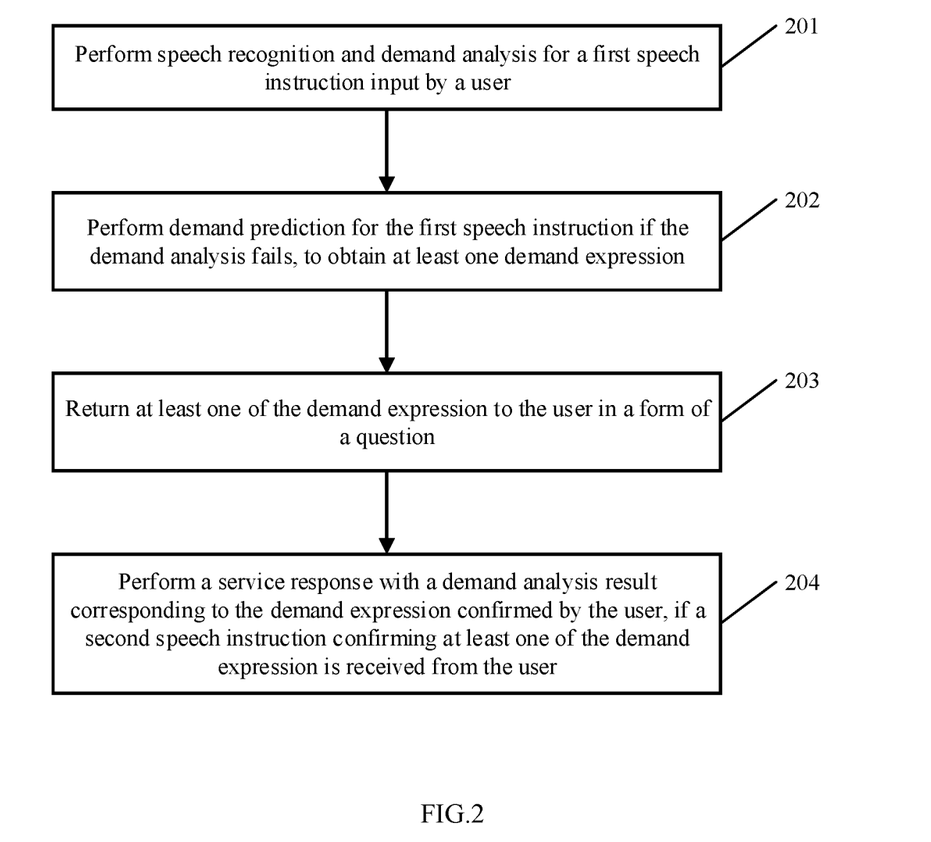
FIG. 2 illustrates a flow chart of a speech interaction method according to Embodiment 1 of the present disclosure.

FIG. 2 illustrates a flow chart of a speech interaction method according to Embodiment 1 of the present disclosure. As shown in FIG. 2, the method may include the following steps:

At 201, speech recognition and demand analysis are performed for a first speech instruction input by the user.

The first speech instruction may be a first speech instruction input by the user after waking up the speech assistant.

"First", "second" and "third" involved by the speech instruction in the present disclosure, for "a first speech instruction", "a second speech instruction" and "a third speech instruction" are not intended to limit the order, number and terms, and only intended to distinguish different speech instructions.

Regarding the first speech instruction input by the user, speech recognition needs to be performed first. Demand analysis is performed after the text obtained from speech recognition is obtained. The demand analysis mainly aims to understand the user's specific demand (also referred to as the intent) and obtain structured information to provide the user with precise service. A specific demand analysis manner and analysis result may be related to a specific vertical class service. This portion of content may employ the prior art and will not be detailed any more here. Only one example is taken as follows:

Assuming that the user inputs the first speech instruction: "please plan a light-traffic route from Xi'eqi via Nanluoguxiang to Beijing Railway Station for me", the following analysis result is obtained after speech recognition and demand analysis are performed:

"Intent: route planning
Travel manner: driving a vehicle
Departure: Xi'erqi
Destination: Beijing Railway Station
A point on the path: Nanluoguxiang
Screening condition: light traffic".

At 202, if the analysis of the demand fails, the demand is predicted for the first speech instruction to obtain at least one demand expression.

However, when the analysis of the demand is performed, it might fail for some reasons, i.e., the user's demand type and structured information etc. cannot be obtained accurately. In this case, in the present disclosure the user is not simply and bluntly advised of the failed analysis, and instead the demand is predicted for the first speech instruction, i.e., the user's demand is guessed and at least one demand expression obtained from the prediction is returned to the user.

At 203, at least one of the demand expression is returned to the user in a form of a question.

At 204, if a second speech instruction confirming at least one of the demand expression is received from the user, a service response is performed with a demand analysis result corresponding to the demand expression confirmed by the user.

Many implementation modes may be employed in the present disclosure. For example, a manner of multiple rounds of interaction may be employed, one demand expression is returned to the user each time, and then the user may be asked with a general question. If the confirmation of one of the demand expressions is obtained, the service response is performed with the demand analysis result corresponding to the confirmed demand expression. If a negative answer is obtained, next round of interaction is continued by returning a demand expression to the user in a form of a general question, and so on so forth, until a preset maximum number of rounds of interaction are reached. This manner will be subsequently described in detail in Embodiment 2.

As another example, a plurality of demand expressions may be returned to the user each time, and then the user is asked in a manner of alternative questions. If the user selects one of the demand expressions, the service response is performed according to the demand analysis result corresponding to the demand expression selected by the user. This manner will be subsequently described in detail in Embodiment 3.

Embodiment 2

Figure 3:
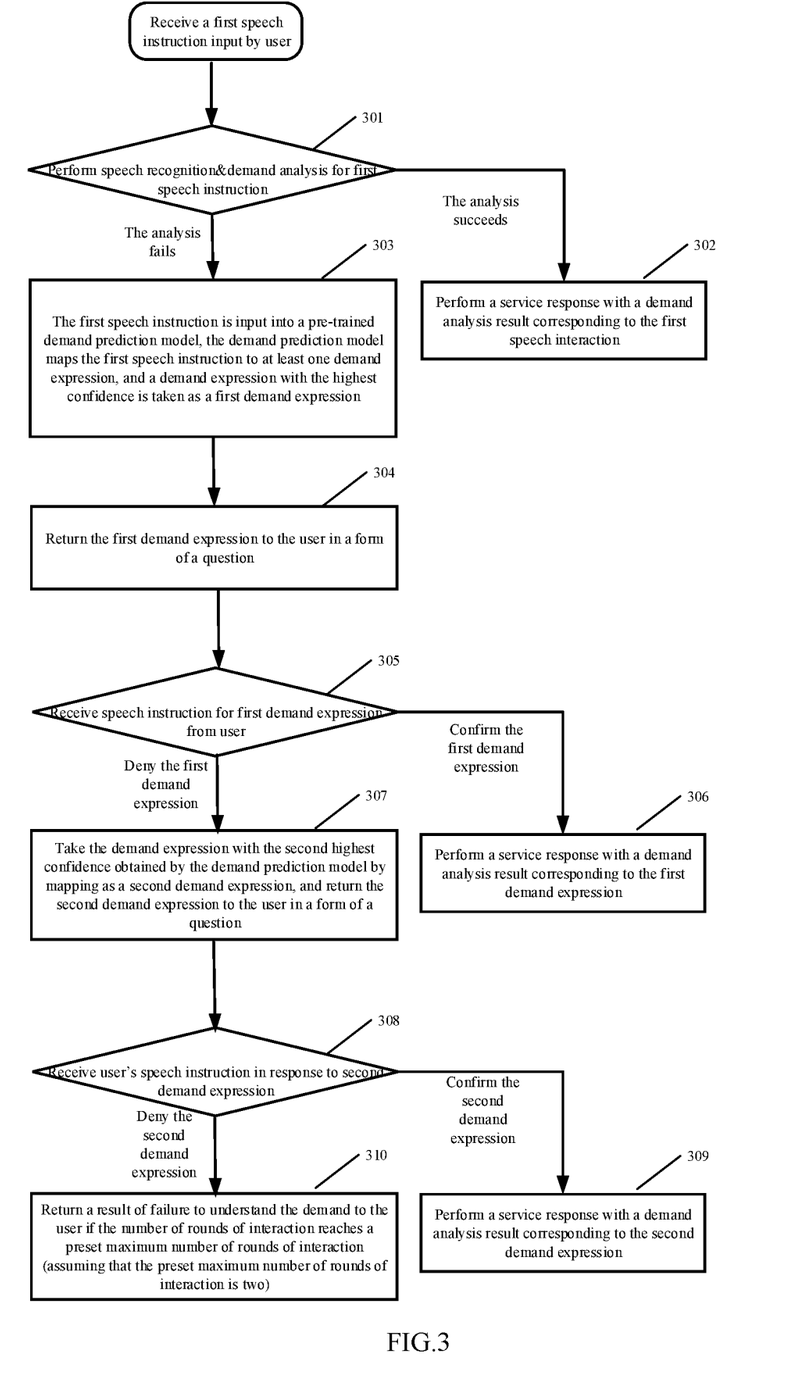
FIG. 3 illustrates a flow chart of a speech interaction method according to Embodiment 2 of the present disclosure.

FIG. 3 illustrates a flow chart of a speech interaction method according to Embodiment 2 of the present disclosure. As shown in FIG. 3, the method may include the following steps:

At 301, speech recognition and demand analysis are performed for a first speech instruction input by the user, and 302 will be performed if the demand analysis succeeds; 303 will be performed if the demand analysis fails.

At 302, a service response is performed with a demand analysis result corresponding to the first speech interaction, and the speech interaction process of this time ends.

If the demand analysis for the first speech instruction input by the user directly succeeds, it is feasible to directly perform the service response with the demand analysis result, without performing multiple rounds of interaction.

At 303, the first speech instruction is input into a pre-trained demand prediction model, the demand prediction model maps the first speech instruction to at least one demand expression, and a demand expression with the highest confidence is taken as a first demand expression.

If the demand analysis for the first speech instruction input by the user fails, the demand is predicted for the first speech instruction. In the embodiment of the present disclosure, the pre-trained demand prediction model may be used for demand prediction. The demand prediction model can map the first speech instruction to many demand expressions close to the first speech instruction, thereby "guessing" the user demand represented by the first speech instruction. At least one demand expression obtained by the demand prediction model by mapping each has a confidence which represents an accuracy degree of predicting the demand corresponding to the first speech instruction.

To facilitate understanding, a preferred embodiment is introduced to illustrate a process of training the demand prediction model. Considering limitations of the speech interaction, on the one hand, diverse search results are unlikely to be returned to the user in a very general manner, and on the other hand, the number of the returned search results is not very large. Usually only in the case that the user's demand is definite, several search results corresponding to the demand are returned. Regarding text search, it does not have the limitation in this aspect. As long as the user inputs a text search query, a large number of search results will be returned to the user based on similarity degree sorting, and the user can look for his desired content from the search results, and click the desired content even further obtain the vertical class service. In the embodiment of the present disclosure, the content of a text search log may be taken as a basis, and the demand expression corresponding to the user's query may be extracted therefrom, i.e., training data are obtained from the text search log to train the demand prediction model.

Specifically, the process of training the demand prediction model may include the following steps:

Step S1: obtaining training data which include a large number of sentence pairs, each sentence pair including two sentences: a first sentence and a second sentence, wherein the second sentence can be successfully analyzed in respect of the demand, that is to say, the expression employed by the second sentence is an expression that can clarify the demand after the demand analysis.

Step S2: using the training data to train a Seq2Seq (Sequence to Sequence) model to obtain a demand prediction model, wherein the first sentence in the sentence pair serves as an input of the Seq2Seq model, and the second sentence servers as a target output of the Seq2Seq model.

As a preferred embodiment, the training data may be first obtained from the text search log. Certainly, besides the training data are obtained from the text search log, the training data may also be obtained in other manners, for example, the training data are manually created. In the present disclosure, detailed depictions are presented by taking an example in which the training data are obtained from the text search log.

In the text search log, the text search query, namely query input by the user may be used as the first sentence, and the second sentence is obtained using a clicked search result corresponding to the query. The first sentence and second sentence form a sentence pair, and the confidence of the second sentence is determined by the times of click of the second sentence when the first sentence serves as the query.

Usually, when the user performs text search, after the user inputs the query, he will look for a desired search result from a lot of search results. It may be believed that the search result clicked by the user is a search result that complies with the user's demand to a certain degree. Furthermore, the more the search result is clicked, the more the search result meets the user's demand. Furthermore, if the user requests for and obtains the service related to the search result, the search result complies with the user's demand more.

When the second sentence is obtained with the clicked search result, the second sentence may be taken out from the title of the search result, or obtained from the content of the search result. A specific obtaining manner may be related to the specific application. A map-like application is taken as an example below. Assuming that the user inputs the text search query "a nearby nursing place" into the map-like application, a lot of search results returned to the user all are Points of Interest (POIs). For example, the returned POI includes:

POI1: Mummy-Love-Cute Baby Mummy and Baby Articles Store
POI2: Bei'ai Beiqin Postnatal Care Center
POI3: EC Mall Assuming that the user clicks POI3, the second sentence may be formed with the class of the POI, or the class of the POI and the attribute tag of the POI. For example, the class of the POI "EC Mall" is a "shopping mall" and the attribute tag includes "with a nursing room", so "a shopping center with a nursing room" can be obtained as the second sentence, and it forms a sentence pair with the first sentence "a nearby nursing place".

In a similar manner, it is assumed that the following sentences and confidences may be obtained:

| First sentence | Second sentence | Confidence |
| --- | --- | --- |
| A nearby nursing place | Shopping center | 0.51 |
| A nearby nursing place | Shopping center with a nursing room | 0.25 |
| A nearby nursing place | Postnatal care center | 0.11 |
| A nearby nursing place | Mummy-baby articles store | 0.09 |
| A nearby nursing place | Shopping center with a charging post | 0.04 |

Sentences with the confidence lower than a preset confidence threshold are filtered away, and the second sentence formed by the class of the POI and the attribute tag of the POI is preferably selected. The obtained sentence and confidence may be taken as the training data, where the first sentence serves as the input of the seq2seq model, and the second sentence and its confidence serve as the output of the seq2seq model. The training data seq2seq model is an encoder-decoder, and the input is a sequence and the output is also a sequence. The encoder changes an input sequence with a variable length into a vector with a fixed length, and the decoder decodes the vector with the fixed length into an output sequence with a variable length. A maximum likelihood estimation manner may be employed upon training.

In addition, the training of the seq2seq model may further be performed by taking the sentence pair determined in the above manner as a positive sample, and taking the sentence formed by the query and the second sentence obtained with the unclicked search result as a negative sample. A training target is maximizing a difference between the confidence of the second sentence in the positive sample and the confidence of the second sentence in the negative sample.

Certainly, the demand prediction model may also be implemented in other manners in addition to the manner of obtaining the demand prediction model with the training seq2seq model. For example, the demand prediction model may also be implemented by manually creating a demand mapping table, i.e., by taking one sentence as the input and by taking at least one mapped sentence obtained by querying the demand mapping table as the output.

Regarding at least one demand expression obtained by the demand prediction model by mapping, the demand expression with the highest confidence may be taken as the first demand expression and first returned to the user in the present embodiment. In the present disclosure, the "first" and "second" etc. involved by the demand expressions, e.g., "first demand expression" and "second demand expression" are not intended to limit the order, number and terms, and only intended to distinguish different demand expressions.

Still take the user-input first speech instruction "Can you help me to find a nursing place nearest to me? The baby is hungry. Thanks." as an example. After the demand analysis fails for a reason or some reasons, the first speech instruction is input into the demand prediction model, and the demand prediction model performs mapping for the first speech instruction to obtain the following demand expressions and corresponding confidence:

| | |
| --- | --- |
| Shopping center with a nursing room | 0.92 |
| Postnatal care center | 0.81 |
| Mummy-baby articles store | 0.68 |
| ... | |

"Shopping center with a nursing room" is combined with a preset template to obtain "find a shopping center with a nursing room closest to you" as the first demand expression, wherein "find a . . . closest to you" is the preset template and aims to make the demand expression more smooth and compliant with the question-answer tactic. It is also feasible not to add the preset template.

At 304, the first demand expression is returned to the user in a form of a question.

In the present embodiment, the first demand expression may be returned to the user in a form of a general question. As such, the user only needs to answer with simple speech such as "Yes/No", "need/not need", "may/may not" and "true/false".

Furthermore, to clearly advise the user of the reasons why the demand analysis fails this time to reduce the user's anxiety and doubt and improve the user experience, in the present embodiment, the reason for failure of the demand analysis may be analyzed, and the above question may further carry the reason for failure of the demand analysis.

The analysis of the reason for failure of the demand analysis may include but not limited to any of the following types of processing or any combination thereof:

The first type of processing: upon speech recognition, noise in the background in which the user inputs the first speech instruction is detected; in the case where the noise is serious, the noise will exert an impact on the speech recognition phase, thereby causing the failure of the subsequent demand analysis.

The second type of processing: pronunciation is detected during the speech recognition to detect whether the user's pronunciation is accurate. If the pronunciation is inaccurate, the pronunciation will also exert an impact on the speech recognition phase, thereby causing the failure of the subsequent demand analysis.

The third type of processing: a text length is detected for the speech recognition result of the first speech instruction. A too long sentence will exert an unfavorable impact on the demand analysis, for example, it is very difficult to analyze to get the semantics of a too long sentence upon semantic analysis, thereby causing the failure of the demand analysis.

The fourth type of processing: colloquialism detection is performed for the speech recognition result of the first speech instruction. A sentence which is too colloquial will also exert an impact on the semantic analysis, thereby causing the failure of the demand analysis.

Other types of processing might exist and will not be exhausted one by one here.

The reason for the failure of demand analysis corresponding to the above types of processing may include for example: noisy environment, inaccurate pronunciation of the first speech instruction, the length of the first speech instruction beyond a limit, too colloquial expression of the first speech instruction, excessive generalization of the first speech instruction and so on.

In addition, the preset template may be used to form a general question upon asking a question, for example, "Need I look it up for you?", "whether to look it up for you?", "Do you mean . . . ?", etc.

Continuing with the above example, in response to the user-input first speech instruction "Can you help me to find a nursing place nearest to me? The baby is hungry. Thanks.", the speech assistant may return: "the sentence you input is too general, XX cannot understand you. Do you mean to find a shopping center with a nursing room closest to you?"

At 305, a speech instruction for the first demand expression is received; if a second speech instruction confirming the first demand expression is received from the user, 306 will be performed; if a third speech instruction denying the first demand expression is received from the user, 307 will be performed.

In the present embodiment, the user only needs to reply to confirm or deny the first demand expression.

At 306, a service response is performed with a demand analysis result corresponding to the first demand expression, and the speech interaction process of this time ends.

Continuing with the above example, since the first demand expression is the demand expression with the highest confidence, so it is much probable for the user to confirm "the sentence you input is too general, XX cannot understand you. Do you mean to find a shopping center with a nursing room closest to you?" If the second speech instruction returned by the user is confirming the first demand expression, the demand analysis result of the first demand expression is:

"Intent: search for information

Departure: the current location

Search query: shopping center

Screening condition: nursing room, and closest distance"

After the search, the shopping center with a nursing room closest to the user is returned to the user.

At 307, the demand expression with the second highest confidence obtained by the demand prediction model by mapping is taken as a second demand expression, and the second demand expression is returned to the user in a form of a question.

Continuing with the above example, if the user returns a third speech instruction "No" in response to "the sentence you input is too general, XX cannot understand you. Do you mean to find a shopping center with a nursing room closest to you?", "Do you mean to find a postnatal care center closest to you?" may be returned to the user.

At 308, the user's speech instruction in response to the second demand expression is received: 309 will be performed if the second speech instruction confirming the second demand expression is received; 310 will be performed if the third speech instruction denying the second demand expression is received.

At 309, a service response is performed with a demand analysis result corresponding to the second demand expression, and the speech interaction process of this time ends.

At 310, a result of failure to understand the demand is returned to the user if the number of rounds of interaction reaches a preset maximum number of rounds of interaction (assuming that the preset maximum number of rounds of interaction is two).

If the user still denies the second demand expression and the number of rounds of interaction has already reached the preset maximum number of rounds of interaction two, the result of failure to understand the demand may be returned to the user, for example, "fail to understand your demand". It is also possible to prompt the user to re-input the first speech instruction, e.g., "fail to understand your demand, please turn to a simpler instruction".

Two is taken as the maximum number of rounds in the present embodiment. If a larger number of rounds is taken as the maximum number of rounds, the demand expression with the third highest confidence obtained by the demand prediction model by mapping may be further returned to the user in a form of a question, until the user's confirmation is received or the preset maximum number of rounds of interaction is reached.

As compared with a traditional scenario, a majority of scenarios corresponding to the present embodiment fall within the following case:

User: Can you help me to find a nursing place nearest to me? The baby is hungry. Thanks.

Speech assistant: the sentence you input is too general, XX cannot understand you. Do you mean to find a shopping center with a nursing room closest to you?"

User: Yes.

The speech assistant returns information of the shopping center with the nursing room closest to the user to the user in a form such as display or speech.

Very obviously, this manner greatly enhances the user's interaction efficiency and user experience as compared with the traditional manner.

Embodiment 3

Figure 4:
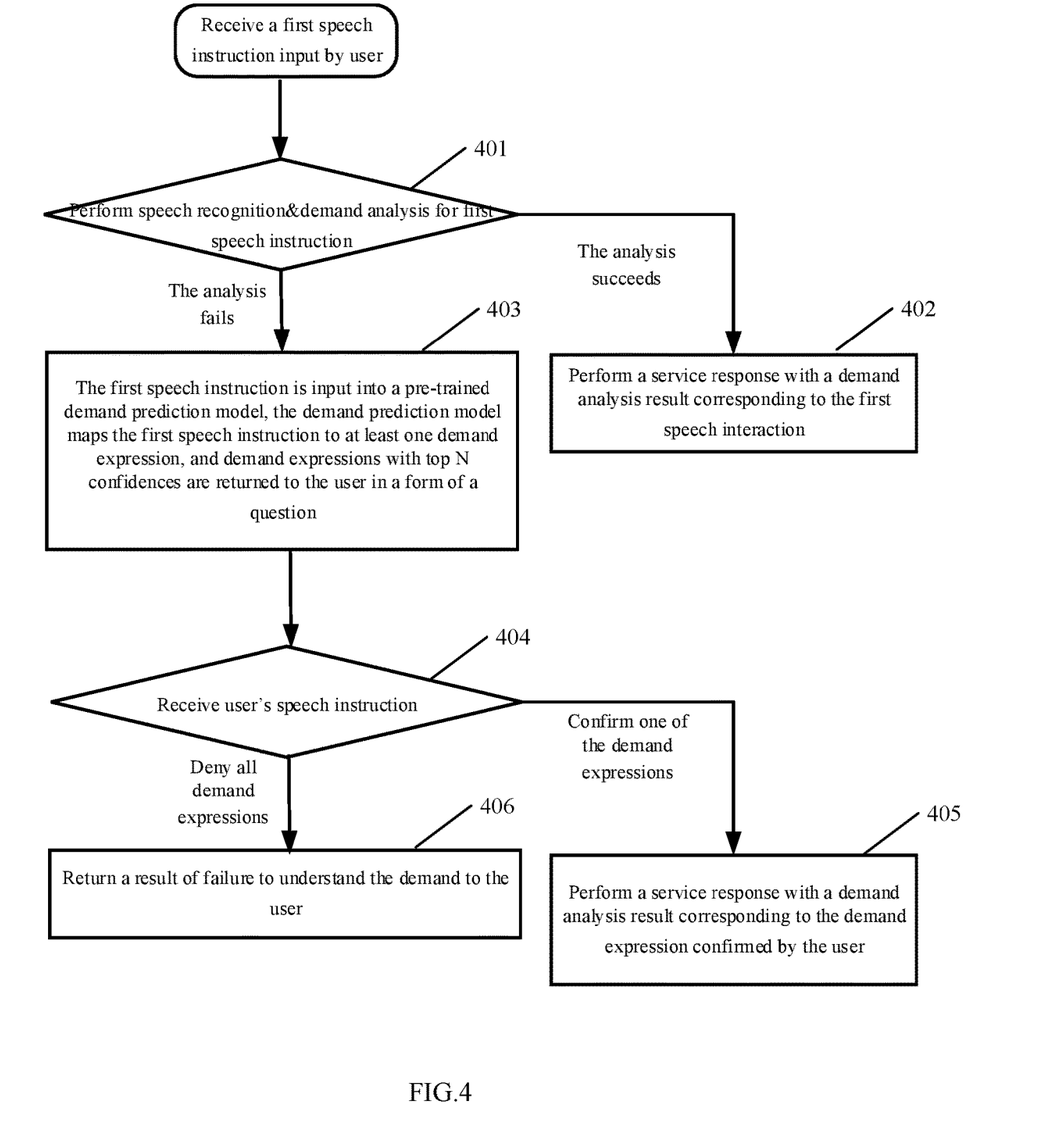
FIG. 4 illustrates a flow chart of a speech interaction method according to Embodiment 3 of the present disclosure.

FIG. 4 illustrates a flow chart of a speech interaction method according to Embodiment 3 of the present disclosure. As shown in FIG. 4, the method may include the following steps:

At 401, speech recognition and demand analysis are performed for a first speech instruction input by the user, and 402 will be performed if the demand analysis succeeds; 403 will be performed if the demand analysis fails.

At 402, a service response is performed with a demand analysis result corresponding to the first speech interaction, and the speech interaction process of this time ends.

At 403, the first speech instruction is input into a pre-trained demand prediction model, the demand prediction model maps the first speech instruction to at least one demand expression, and demand expressions with top N confidences are returned to the user in a form of a question, N being a preset positive integer.

Embodiment 3 differs from Embodiment 2 in that the demand expressions obtained by the demand prediction model by mapping are not returned to the user one by one in each round of interaction, and instead N demand expressions therein are returned to the user together in a form of alternative questions for selection by the user.

Furthermore, to clearly advise the user of the reasons why the demand analysis fails this time to reduce the user's anxiety and doubt and improve the user experience, in the present embodiment, the reason for failure of the demand analysis may be analyzed, and the above question may further carry the reason for failure of the demand analysis. This portion is similar to that in Embodiment 2 and will not be detailed any more here.

An example is taken in which N is two. In response to the first speech instruction "Can you help me to find a nursing place nearest to me? The baby is hungry. Thanks." Input by the user, the speech assistant may return "the sentence you input is too general, XX cannot understand you. Do you mean to find a shopping center with a nursing room closest to you?". As such, it is feasible that the user only needs to reply "the former/the latter".

At 404, the user's speech instruction is received, and 405 will be performed if a speech instruction confirming one of the demand expression is received from the user; 406 will be performed if a speech instruction denying all demand expressions is received from the user.

At 405, a service response is performed with a demand analysis result corresponding to the demand expression confirmed by the user, and the speech interaction process of this time ends.

At 406, a result of failure to understand the demand is returned to the user.

If the user does not confirm any demand expression, he may return a result of failure to understand the demand to the user, for example, "fail to understand your demand". It is also possible to prompt the user to re-input the first speech instruction, e.g., "fail to understand your demand, please turn to a simpler instruction".

As compared with a traditional scenario, a majority of scenarios corresponding to the present embodiment fall within the following case:

User: Can you help me to find a nursing place nearest to me? The baby is hungry. Thanks.

Speech assistant: the sentence you input is too general, XX cannot understand you. Do you mean to find a shopping center with a nursing room closest to you or a postnatal care center closest to you?"

User: the former.

The speech assistant returns information of the shopping center with the nursing room closest to the user to the user in a form such as display or speech.

Very obviously, this manner greatly enhances the user's interaction efficiency and user experience as compared with the traditional manner.

The method according to the present disclosure is described in detail above. An apparatus according to the present disclosure will be described below in detail in conjunction with embodiments.

Embodiment 4

Figure 5:
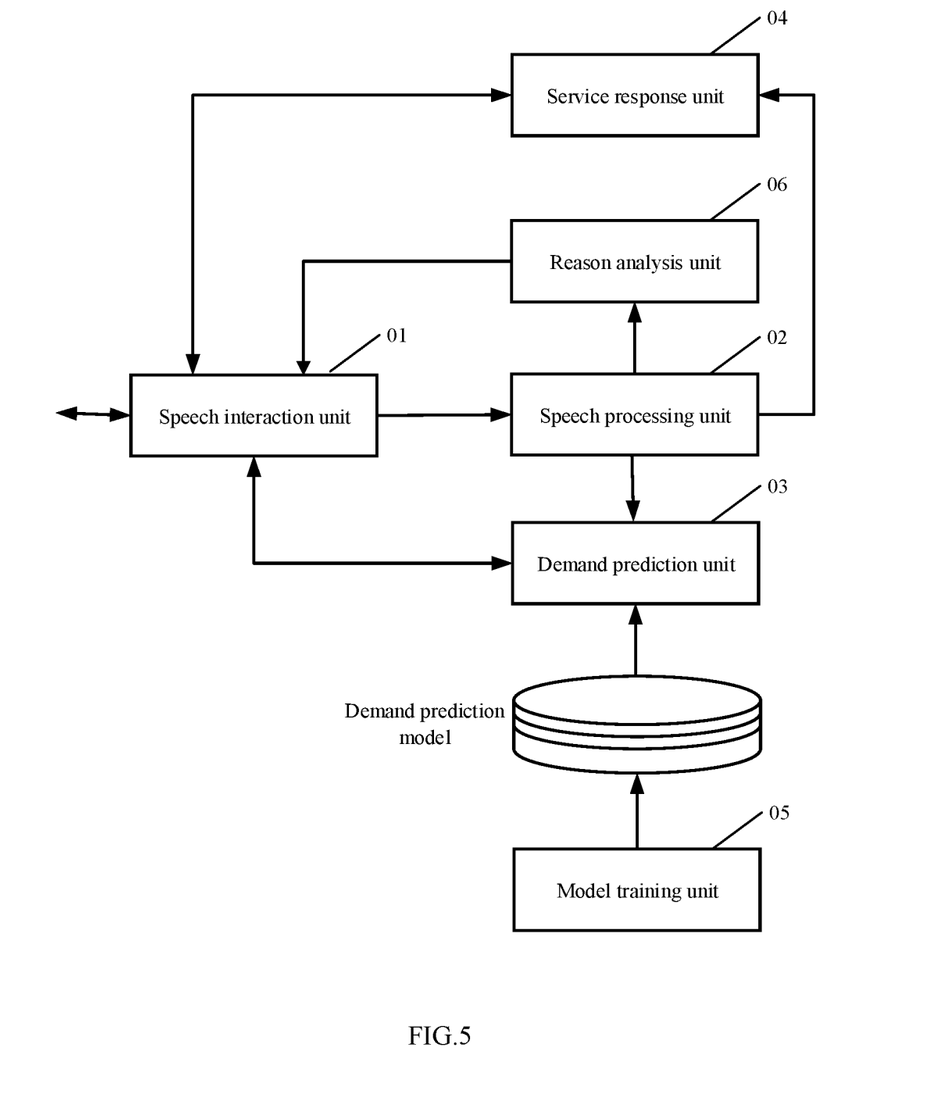
FIG. 5 illustrates a block diagram of a speech interaction apparatus according to Embodiment 4 of the present disclosure.

FIG. 5 illustrates a block diagram of a speech interaction apparatus according to Embodiment 4 of the present disclosure. As shown in FIG. 5, the apparatus may comprises: a speech interaction unit 01, a speech processing unit 02, a demand prediction unit 03 and a service response unit 04, and may further comprise a model training unit 05 and a reason analysis unit 06. Main functions of the units are as follows:

The speech interaction unit 01 is configured to receive and transfer data from the user and return data to the user. The speech interaction unit first receives a first speech instruction input by the user.

The speech processing unit 02 is configured to perform speech recognition and demand analysis for the first speech instruction. Regarding the first speech instruction input by the user, speech recognition needs to be performed first. The demand analysis is performed after the text obtained from speech recognition is obtained. The demand analysis mainly aims to understand the user's specific demand (also referred to as the intent) and obtain structured information to provide the user with precise service. A specific demand analysis manner and analysis result may be related to a specific vertical class service. This portion of content may employ the prior art and will not be detailed any more here.

If the demand analysis succeeds, the service response unit 04 is configured to perform service response with a demand analysis result corresponding to the first speech interaction.

If the demand analysis fails, the demand prediction unit 03 is configured to perform demand prediction for the first speech instruction to obtain at least one demand expression. Then, the speech interaction unit 01 returns at least one of the demand expression to the user in a form of a question.

If the speech interaction unit 01 receives a second speech instruction confirming at least one of the demand expression, the service response unit 04 performs a service response with the demand analysis result corresponding to the demand expression confirmed by the user.

Specifically, the demand prediction unit 03 may input the first speech instruction into a pre-trained demand prediction model, and the demand prediction model maps the first speech instruction to at least one demand expression. The at least one demand expression obtained by the demand prediction model by mapping has a confidence which represent an accuracy degree to which the demand corresponding to the first speech instruction can be predicted.

The model training unit 05 is configured to train to obtain the demand prediction model. Specifically, the model training unit 05 obtains training data which include a plurality of sentence pairs, each sentence pair including a first sentence and a second sentence, wherein the second sentence can be successfully analyzed in respect of the demand; uses the training data to train a Seq2Seq model to obtain the demand prediction model, wherein the first sentence in the sentence pair serves as an input of the Seq2Seq model, and the second sentence servers as a target output of the Seq2Seq model.

As a preferred embodiment, the training data may be obtained from a text search log. Specifically, a query in the text search log may be taken as the first sentence, the second sentence is obtained using a clicked search result corresponding to the query, the first sentence and second sentence form the sentence pair, and the confidence of the second sentence is determined by times of click of the second sentence when the first sentence is taken as the query. The larger the number of clicks, the higher the confidence is.

When the speech interaction unit returns at least one of the demand expression to the user in a form of a question, it may employ the following two manners but not limited to the two manners:

The first manner: regarding a demand expression with the highest confidence in the at least one demand expression obtained by the demand prediction model by mapping as the first demand expression, and returning the first demand expression to the user in a form of a question.

If a third speech instruction denying the first demand expression is received from the user, a demand expression with the second highest confidence in the at least one demand expression obtained by the demand prediction model by mapping is taken as a second demand expression, and the second demand expression is returned to the user in a form of a question.

The question in this manner may take a form of a general question. As such, the user only needs to answer with simple speech such as "Yes/No", "need/not need", "may/may not" and "true/false".

In addition, in this manner, the maximum number of rounds of interaction may be limited. When the maximum number of rounds of interaction is reached, the speech interaction unit 01 may return a result of failure to understand the demand to the user, or prompt the user to re-input the first speech instruction.

The second manner: demand expressions with top N confidences in the at least one demand expression obtained by the demand prediction model by mapping are returned to the user in a form of a question, N being a preset positive integer.

In this manner, N demand expressions may be returned to the user in a form of alternative questions for selection by the user.

If the user does not confirm any demand expression, the speech interaction unit 01 may return a result of failure to understand the demand to the user, or prompt the user to re-input the first speech instruction.

Furthermore, the reason analysis unit 06 may analyze the reason for failure of the demand analysis, and the question may further carry the reason for failure of the demand analysis.

The analysis of the reason for failure of the demand analysis may include but not limited to any of the following types of processing or any combination thereof:

The first type of processing: upon speech recognition, noise in the background in which the user inputs the first speech instruction is detected; in a case where the noise is serious, the noise will exert an impact on the speech recognition phase, thereby causing the failure of the subsequent demand analysis.

The second type of processing: pronunciation is detected during the speech recognition to detect whether the user's pronunciation is accurate. If the pronunciation is inaccurate, the pronunciation will also exert an impact on the speech recognition phase, thereby causing the failure of the subsequent demand analysis.

The third type of processing: a text length is detected for the speech recognition result of the first speech instruction. A too long sentence will exert an unfavorable impact on the demand analysis, for example, it is very difficult to analyze to get the semantics of a too long sentence upon semantic analysis, thereby causing the failure of the demand analysis.

The fourth type of processing: colloquialism detection is performed for the speech recognition result of the first speech instruction. A sentence which is too colloquial will also exert an impact on the semantic analysis, thereby causing the failure of the demand analysis.

Other types of processing might exist and will not be exhausted one by one here.

Reasons of the failure of demand analysis corresponding to the above types of processing may include for example: noisy environment, inaccurate pronunciation of the first speech instruction, the length of the first speech instruction beyond a limit, too colloquial expression of the first speech instruction, and so on.

According to embodiments of the present disclosure, the present disclosure further provides an electronic device and a readable storage medium.

Figure 6:
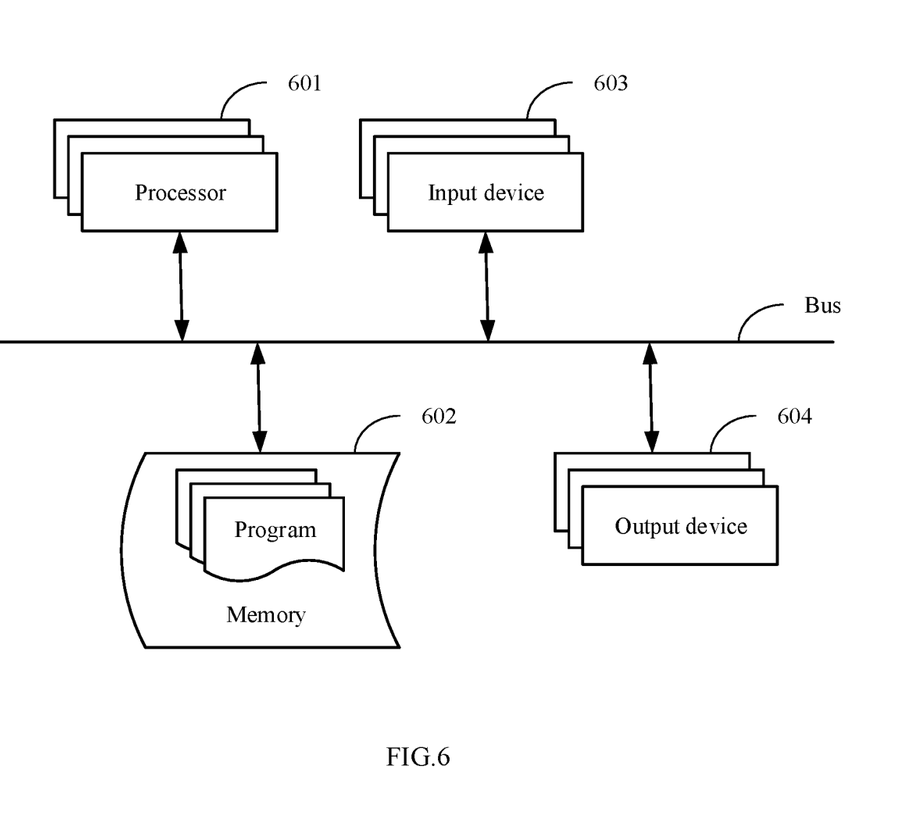
FIG. 6 illustrates a block diagram of an electronic device for implementing the speech interaction method according to embodiments of the present disclosure.

As shown in FIG. 6, it shows a block diagram of an electronic device for implementing the speech interaction method according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 6, the electronic device comprises: one or more processors 601, a memory 602, and interfaces configured to connect components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 601 is taken as an example in FIG. 6.

The memory 602 is a non-transitory computer-readable storage medium provided by the present disclosure. The memory stores instructions executable by at least one processor, so that the at least one processor executes the speech interaction method according to the present disclosure. The non-transitory computer-readable storage medium of the present disclosure stores computer instructions, which are used to cause a computer to execute the speech interaction method by the present disclosure.

The memory 602 is a non-transitory computer-readable storage medium and can be used to store non-transitory software programs, non-transitory computer executable programs and modules, such as program instructions/modules corresponding to the speech interaction method in embodiments of the present disclosure. The processor 601 executes various functional applications and data processing of the server, i.e., implements the speech interaction method in the above method embodiments, by running the non-transitory software programs, instructions and modules stored in the memory 602.

The memory 602 may include a storage program region and a storage data region, wherein the storage program region may store an operating system and an application program needed by at least one function; the storage data region may store data created according to the use of the electronic device. In addition, the memory 602 may include a high-speed random access memory, and may also include a non-transitory memory, such as at least one magnetic disk storage device, a flash memory device, or other non-transitory solid-state storage device. In some embodiments, the memory 602 may optionally include a memory remotely arranged relative to the processor 601, and these remote memories may be connected to the electronic device for implementing the item-recommending method or the method for training the model for simulating the task in the user's item-clicking behavior through a network. Examples of the above network include, but are not limited to, the Internet, an intranet, a local area network, a mobile communication network, and combinations thereof.

The electronic device for implementing the speech interaction method may further include an input device 603 and an output device 604. The processor 601, the memory 602, the input device 603 and the output device 604 may be connected through a bus or in other manners. In FIG. 6, the connection through the bus is taken as an example.

The input device 603 may receive inputted numeric or character information and generate key signal inputs related to user settings and function control of the electronic device for implementing the item-recommending method or the method for training the model for simulating the task in the user's item-clicking behavior, and may be an input device such as a touch screen, keypad, mouse, trackpad, touchpad, pointing stick, one or more mouse buttons, trackball and joystick. The output device 604 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It can be seen from the above depictions that the method, apparatus, device and computer storage medium according to the present disclosure have the following advantages:

1) In the present disclosure, after the demand analysis for the speech instruction input by the user fails, the demand will be predicted for the speech instruction to "guess" the user's possible expression of the demand and return it to the user for confirmation, instead of simply and bluntly advising the user that his speech cannot be understood, thereby improving the user's interaction efficiency and enhancing the user's experience.

2) The user only needs to simply confirm or select the demand expression returned by the speech assistant in a form of a question, needless to re-input the speech instruction by himself/herself in another manner, thereby improving the user's interaction efficiency and enhancing the user's experience.

3) After the understanding of the demand fails, the reason for failure to understand the demand will be analyzed while predicting the user's demand, and the reason obtained from the analysis is returned to the user, thereby easing the user's anxiety and doubt and further enhancing the user's experience.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A computer implemented method for speech interaction between a user and a terminal device, wherein the method comprises:

performing speech recognition and demand analysis for a first speech instruction input to the terminal device by the user;

performing demand prediction for the first speech instruction if the demand analysis fails, to obtain at least one demand expression;

returning by the terminal device, at least one of the demand expression to the user in a form of a question;

performing a service response with a demand analysis result corresponding to the demand expression confirmed by the user, if a second speech instruction confirming the at least one of the demand expression is received from the user, wherein the performing demand prediction for the first speech instruction to obtain at least one demand expression comprises:

inputting the first speech instruction into a pre-trained demand prediction model, the demand prediction model mapping the first speech instruction to at least one demand expression, wherein the demand prediction model is obtained by pre-training in the following manner:

obtaining training data which include a plurality of sentence pairs, each sentence pair including a first sentence and a second sentence, wherein the second sentence can be successfully analyzed in respect of the demand;

using the training data to train a Sequence to Sequence Seq2Seq model to obtain the demand prediction model, wherein the first sentence in the sentence pair serves as an input of the Seq2Seq model, and the second sentence serves as a target output of the Seq2Seq model, wherein the training data is obtained from a text search log;

wherein a text search query is taken as the first sentence, the second sentence is obtained using a clicked search result corresponding to the query, the first sentence and second sentence form the sentence pair, and a confidence of the second sentence is determined by times of click of the second sentence when the first sentence is taken as the query.

2. The method according to claim 1, wherein the method further comprises:

if the demand analysis succeeds, performing a service response with a demand analysis result corresponding to the first speech interaction.

3. The method according to claim 1, wherein the returning at least one of the demand expression to the user in a form of a question comprises:

regarding a demand expression with the highest confidence in the at least one demand expression obtained by the demand prediction model by mapping as the first demand expression;

returning the first demand expression to the user in a form of a question.

4. The method according to claim 3, wherein the returning at least one of the demand expression to the user in a form of a question comprises:

if a third speech instruction denying the first demand expression is received from the user, taking a demand expression with the second highest confidence in the at least one demand expression obtained by the demand prediction model by mapping as a second demand expression;

returning the second demand expression to the user in a form of a question.

5. The method according to claim 1, wherein the returning at least one of the demand expression to the user in a form of a question comprises:

returning demand expressions with top N confidences in the at least one demand expression obtained by the demand prediction model by mapping to the user in a form of a question, N being a preset positive integer.

6. The method according to claim 1, wherein the method further comprises:

analyzing a reason for failure of the demand analysis, the question further carrying the reason for failure of the demand analysis.

7. The method according to claim 6, wherein the reason for the failure of demand analysis comprises:

noisy environment, a length of the first speech instruction beyond a limit, inaccurate pronunciation of the first speech instruction, or too colloquial expression of the first speech instruction.

8. An electronic device, comprising:

at least one processor; and a memory communicatively connected with the at least one processor;

wherein the memory stores instructions executable by the at least one processor, and the instructions are executed by the at least one processor to enable the at least one processor to perform a method for speech interaction between a user and a terminal device, wherein the method comprises:

performing speech recognition and demand analysis for a first speech instruction input to the terminal device by the user;

performing, by the terminal device, demand prediction for the first speech instruction if the demand analysis fails, to obtain at least one demand expression;

returning at least one of the demand expression to the user in a form of a question;

performing a service response with a demand analysis result corresponding to the demand expression confirmed by the user, if a second speech instruction confirming the at least one of the demand expression is received from the user, wherein the performing demand prediction for the first speech instruction to obtain at least one demand expression comprises:

inputting the first speech instruction into a pre-trained demand prediction model, the demand prediction model mapping the first speech instruction to at least one demand expression, wherein the demand prediction model is obtained by pre-training in the following manner:

obtaining training data which include a plurality of sentence pairs, each sentence pair including a first sentence and a second sentence, wherein the second sentence can be successfully analyzed in respect of the demand;

using the training data to train a Sequence to Sequence Seq2Seq model to obtain the demand prediction model, wherein the first sentence in the sentence pair serves as an input of the Seq2Seq model, and the second sentence serves as a target output of the Seq2Seq model, wherein the training data is obtained from a text search log;

wherein a text search query is taken as the first sentence, the second sentence is obtained using a clicked search result corresponding to the query, the first sentence and second sentence form the sentence pair, and a confidence of the second sentence is determined by times of click of the second sentence when the first sentence is taken as the query.

9. The electronic device according to claim 8, wherein the method further comprises:
    if the demand analysis succeeds, perform a service response with a demand analysis result corresponding to the first speech interaction.

10. The electronic device according to claim 8, wherein the returning at least one of the demand expression to the user in a form of a question comprises:
    regarding a demand expression with the highest confidence in the at least one demand expression obtained by the demand prediction model by mapping as the first demand expression;
    returning the first demand expression to the user in a form of a question.

11. The electronic device according to claim 10, wherein the returning at least one of the demand expression to the user in a form of a question comprises:
    if a third speech instruction denying the first demand expression is received from the user, take a demand expression with the second highest confidence in the at least one demand expression obtained by the demand prediction model by mapping as a second demand expression;
    return the second demand expression to the user in a form of a question.

12. The electronic device according to claim 8, wherein the returning at least one of the demand expression to the user in a form of a question comprises:
    returning demand expressions with top N confidences in the at least one demand expression obtained by the demand prediction model by mapping to the user in a form of a question, N being a preset positive integer.

13. The electronic device according to claim 8, wherein the method further comprises:
    analyzing a reason for failure of the demand analysis, the question further carrying the reason for failure of the demand analysis.

14. A non-transitory computer readable storage medium with computer instructions stored thereon, wherein the computer instructions are used for causing a computer to perform a method for speech interaction between a user and a terminal device, wherein the method comprises:
    performing speech recognition and demand analysis for a first speech instruction input to the terminal device by a-the user;
    performing demand prediction for the first speech instruction if the demand analysis fails, to obtain at least one demand expression;
    returning ,by the terminal device, at least one of the demand expression to the user in a form of a question;
    performing a service response with a demand analysis result corresponding to the demand expression confirmed by the user, if a second speech instruction confirming the at least one of the demand expression is received from the user,
    wherein the performing demand prediction for the first speech instruction to obtain at least one demand expression comprises:
    inputting the first speech instruction into a pre-trained demand prediction model, the demand prediction model mapping the first speech instruction to at least one demand expression,
    wherein the demand prediction model is obtained by pre-training in the following manner:
    obtaining training data which include a plurality of sentence pairs, each sentence pair including a first sentence and a second sentence, wherein the second sentence can be successfully analyzed in respect of the demand;
    using the training data to train a Sequence to Sequence Seq2Seq model to obtain the demand prediction model, wherein the first sentence in the sentence pair serves as an input of the Seq2Seq model, and the second sentence serves as a target output of the Seq2Seq model,
    wherein the training data is obtained from a text search log;
        wherein a text search query is taken as the first sentence, the second sentence is obtained using a clicked search result corresponding to the query, the first sentence and second sentence form the sentence pair, and a confidence of the second sentence is determined by times of click of the second sentence when the first sentence is taken as the query.

\* \* \* \* \*